United States Patent Office 3,551,575
Patented Dec. 29, 1970

3,551,575
TREATMENT OF INFLUENZA A INFECTIONS
Eugène L. Leroi, Bievres, and Jean A. Renault, Paris, France, assignors, by mesne assignments, to Societe Civile de Rechercher d'Applications Scientifiques, Issy-les-Moulineaux, France
No Drawing. Filed Mar. 11, 1968, Ser. No. 711,894
Claims priority, application Great Britain, Mar. 13, 1967, 11,720/67
Int. Cl. A61k 27/00
U.S. Cl. 424—316     1 Claim

ABSTRACT OF THE DISCLOSURE

This invention relates to a method of treating patients suffering from influenza infection with mercaptosuccinates of 1-phenyl 2-amino ethane or 1-phenyl 1-amino ethane.

---

This invention relates to a new use of the pharmaceutical compositions described and claimed in our previous Pat. 3,271,248.

During a thorough clinical investigation bearing on detoxicant activity, some of the these compositions were tested on patients suffering from influenza and a strong improvement was noticed.

In order to get sure of the kind of action on these compositions, a complete pharmacological investigation was undergone with the compounds themselves, as reported hereinunder.

The compounds involved were neutral mercaptosuccinates of (d,l) 1-phenyl 1-amino ethane and 1-phenyl 2-amino ethane.

(1) ACTION ON INFLUENZA A VIRUS (MICE)

Mice were infected intranasally by 10,000 times the LD50 of influenza virus A. By intraperitoneal injection of 100 mg./kg. of 1-phenyl 1-amino ethane mercaptosuccinate the inflammatory response normally shown by the lungs of mice infected by this virus was suppressed.

(2) ACTION ON ROUS SARCOMA VIRUS (CHICKS)

Chicks (about 125 g. each) were infected, under the wings, by 20 times the LD50 of Rous Sarcoma virus (Byran strain); then, they receive, daily 20 mg. of 1-phenyl 1-amino ethane mercaptosuccinate. The appearance of tumers has been significantly delayed with respect to the controls.

(3) ANTI-COLONY ACTIVITY ON VIRUS SINDBIS (ON CELLS CULTURES)

A sery of sterile culture of chicken embryo cells was prepared and infested by Sindbis virus.

By adding at increasing concentrations of 1-phenyl 2-amino ethane mercaptosuccinate and comparison with controls, 50% of inhibition of growth of the colonies is attained with a dilution at $\frac{1}{560}$ while the inhibition is complete at a dilution of about $\frac{1}{30}$. The compound has no cytopathogenic action. These pharmacological experimentations confirm that the clinical success was not a hazard.

As to the doses to use in human therapeutic they are in the range of 0.005 to 0.200 g. daily according to weight and virus.

As to the forms, any usual form may be used and some examples are given hereunder.

INJECTABLE SOLUTION 1-phenyl 1-amino ethane mercaptosuccinate, 50 mg. to be dissolved extemporanally in 10 ml. of isotonic saline solution.

SOLUTION FOR AEROSOLS 1-phenyl 1-amino ethane mercaptosuccinate, 50 mg.,., to be dissolved extemporanally in 10 ml.of distilled water saturated by encalyptol.

COATED TABLETS

| | Mg. |
|---|---|
| (d,l) 1-phenyl 1-amino ethane mercaptosuccinate | 5 |
| Lactose | 30 |
| Magnesium stearate | 10 |

Enteric coating q.s. for a 50 mg. tablet.

In all the above mentioned formulae, 1-phenyl 2-amino ethane mercaptosuccinate can be replaced by (d,l) 1-phenyl 1-amino ethane mercaptosuccinate or vice-versa, or they can be mixed in the same formula.

We claim:
1. A method of treating patients suffering from influenza A, infection comprising administering daily to said patients 0.005 to 0.2 g. of one neutral salt selected from the group consisting of the neutral mercaptosuccinates of (d,l) 1-phenyl 1-amino ethane and 1-phenyl 2-amino ethane, together with an appropriate carrier.

References Cited

UNITED STATES PATENTS 3,271,248  9/1966  Renault et al. _____ 424—316

OTHER REFERENCES

Andrewes, Viruses of Vertebrates, Williams and Wilkins Co., Baltimore, Md., 1964, pages 171–180.
Antibiotic News, vol. 5, No. 9, October 1968, pages 1 and 3.

JEROME D. GOLDBERG, Primary Examiner